United States Patent [19]

Lepelletier

[11] Patent Number: 4,788,887
[45] Date of Patent: Dec. 6, 1988

[54] ADAPTABLE LAYSHAFT TYPE GEARBOX USING A PLANETARY GEARSET, IN PARTICULAR FOR AUTOMOBILE VEHICLES

[75] Inventor: Pierre A. G. Lepelletier, Chatou, France

[73] Assignee: Valeo, Paris, France

[21] Appl. No.: 928,099

[22] Filed: Nov. 7, 1986

[30] Foreign Application Priority Data

Nov. 8, 1985 [FR] France ................................ 8516585

[51] Int. Cl.$^4$ ............................................. F16H 37/06
[52] U.S. Cl. ........................................ 74/674; 74/762; 74/333
[58] Field of Search ................. 74/674, 333, 322, 323, 74/324, 665 T, 665 B, 370, 371, 372, 358, 359, 360, 762, 763, 781 R, 782, 783, 789, 790, 791

[56] References Cited

U.S. PATENT DOCUMENTS

| | | | |
|---|---|---|---|
| 2,077,058 | 4/1937 | Rambausek | 74/358 |
| 2,853,890 | 9/1958 | Kelbel | 74/665 |
| 3,339,431 | 9/1967 | Croswhite et al. | 74/763 X |
| 3,470,766 | 10/1969 | Magg et al. | 74/665 T |
| 3,533,307 | 10/1970 | Gunderson | 74/740 |
| 3,548,680 | 12/1970 | Crooks | 74/682 |
| 3,820,418 | 6/1974 | Ott | 74/763 X |
| 4,138,906 | 2/1979 | Nakao et al. | 74/674 |
| 4,188,838 | 2/1980 | Nakao et al. | 74/665 T X |
| 4,296,645 | 10/1981 | Jameson | 74/688 |
| 4,395,925 | 8/1983 | Gaus | 74/763 |
| 4,404,869 | 9/1983 | Numazawa et al. | 74/781 R |

FOREIGN PATENT DOCUMENTS

| | | |
|---|---|---|
| 0069506 | 1/1983 | European Pat. Off. |
| 921729 | 12/1954 | Fed. Rep. of Germany |
| 1075395 | 2/1960 | Fed. Rep. of Germany |
| 1530581 | 10/1969 | Fed. Rep. of Germany ........ 74/674 |
| 1911756 | 6/1970 | Fed. Rep. of Germany |
| 615089 | 12/1948 | United Kingdom |

OTHER PUBLICATIONS

"ZF Gearbox Development", Automobile Engineer, Jan. 1960,. pp. 2–9.

M. Leboime, "Les transmissions hydrocinétiques à plusieurs embrayages", Ingénieurs de l'automobile, Oct. 1975, pp. 285–288.

*Primary Examiner*—Lawrence Staab
*Assistant Examiner*—Dwight G. Diehl
*Attorney, Agent, or Firm*—Charles E. Brown; Charles A. Brown

[57] ABSTRACT

A gearbox comprises parallel primary or input and secondary or output shafts in a casing. An output gear train of two constant-mesh gearwheels is fastened to the secondary shaft. An independent input gear train of four constant-mesh gearwheels and a first and a second clutch are mounted on the primary shaft. A third clutch is mounted on the secondary shaft. The first and third clutches respectively couple the input train to the primary shaft and to the secondary shaft. A three-element planetary gearset concentric with the primary shaft comprises a sun gear fastened to the input train, a planet carrier coupled to the primary shaft by the second clutch and a ring gear fastened to the output train. Thus the gearbox features three gear ratios by respective combinations of pairs of the three clutches. This arrangement constitutes a basic gearbox. More complex gearboxes derived from the basic gearbox comprise a supplementary gear train and a fourth clutch and/or a first brake and/or a second brake for respectively driving and/or immobilizing the sun gear and/or the planet carrier. This provides numerous additional forward and reverse gear ratios that are always well distributed and easy to control.

22 Claims, 13 Drawing Sheets

ADAPTABLE LAYSHAFT TYPE GEARBOX USING A PLANETARY GEARSET, IN PARTICULAR FOR AUTOMOBILE VEHICLES

BACKGROUND OF THE INVENTION

1. Field of the Invention

The present invention concerns gearboxes of the layshaft type, in particular for automobile vehicles, comprising for the purpose of selecting gear ratios clutches that are preferably operated while under load, such as hydraulic clutches for example, replacing wholly or in part conventional dog type systems with or without synchromesh.

2. Description of the Prior Art

It is known to implement such gearboxes with a small number of gear ratios, for example two or three forward gear ratios—one of which is generally a direct drive—and one reverse gear ratio, with a primary shaft and a secondary shaft, a gear train and a clutch for each gear ratio, and a separate special gear for the reverse gear ratio.

Such gearboxes are simple, rugged and efficient and of acceptable cost and overall size, but their performance remains somewhat limited and more often than not the reverse gear ratio is somewhat perfunctorily implemented by means of a dog type system.

Similarly, it is known to implement gearboxes with a larger number of gear ratios, for example four forward gear ratios and two or four reverse gear ratios, by combining two ranges of two gear ratios and one reversing unit, or with three forward gear ratios and three reverse gear ratios, or again with five forward gear ratios and one reverse gear ratio, etc.

Such gearboxes are still rugged and efficient but entail multiple layshafts and clutches so that their complexity, cost and overall size increase out of proportion to the number of gear ratios if an adequate level of performance is to be achieved. Also, in dual range gearboxes changing the range entails a shifting sequence that is no longer a single operation but a double operation—that is to say involving the simultaneous control of four clutches instead of two—resulting in much greater variations in inertia and much more serious problems in controlling the shifting, while the steps in the gearbox are precisely the same in both ranges, imposing gear ratio distributions that are often inappropriate.

Finally, and in a general way, these known gearboxes do not have any braked neutral setting, that is to say a combination in which the input to the gearbox is free and the output is immobilized, corresponding to the specific case where the ratio between the output speed and the input speed is equal to zero. The advantages of this type of combination, which is lacking in the types of gearbox under discussion, are specifically to permit immobilization of the vehicle with the motor running, notably during momentary stops imposed by traffic conditions, without needing to constantly apply the brakes of the vehicle, to guarantee good control over and continuity of changes between the forward gear ratios and the reverse gear ratios on reversing, and so on, all these factors tending to increase significantly driver comfort.

The object of the present invention is thus a gearbox retaining the original qualities of simplicity, ruggedness and efficiency of the known gearboxes with few gear ratios mentioned above, but also featuring, with a minimum of components and acceptable cost and overall dimensions, an increasing number of forward and reverse gear ratios that are always well distributed, a braked neutral setting in addition to the conventional unbraked neutral setting, and shifting sequences that always entail single operations only from one end to the other of the range—that is to say from the highest reverse gear ratio to the highest forward gear ratio—lending itself perfectly to any kind of control system.

SUMMARY OF THE INVENTION

The invention consists in a gearbox comprising a casing, parallel primary or input and secondary or output shafts in said casing, a single output gear train of two constant-mesh gearwheels fastened to said secondary shaft, an independent double input gear train of four constant-mesh gearwheels, a first clutch and a second clutch located on said primary shaft, a third clutch located on said secondary shaft, said first and third clutches respectively coupling said input train to said primary shaft and said secondary shaft, and a three-element planetary gearset concentric with said primary shaft and comprising a sun gear fastened to said input train, a planet carrier coupled to said primary shaft by said second clutch and a ring gear fastened to said output train, whereby the gearbox features three gear ratios defined by respective combinations of pairs of said three clutches.

Depending on whether the speed ratio of the input train between the sun gear and the planetary gearset and the first clutch is less than, equal to or more than unity, the third gear ratio is respectively an overdrive ratio, a direct drive ratio or a less than one-to-one ratio, in this context direct drive meaning rotation of the planetary gearset as a whole.

This gearbox is the basic gearbox. In accordance with another feature of the invention, this gearbox is adaptable and has provision for implementing a whole series of highly standardized gearboxes with increasing numbers of gear ratios, by simple addition of minimum additional components, as will now be explained.

By adding to the basic gearbox a first brake for immobilizing the sun gear and/or a second brake for immobilizing the planet carrier the gearbox is respectively provided with a fourth gear ratio and a first braked neutral setting by combination of the first brake with the second and third clutches, and/or a reverse gear ratio and a second braked neutral setting by combination of the second brake with the first and third clutches, and a third braked neutral setting by combination of the first brake with the second brake.

By adding to the basic gearbox a supplementary gear train of constant-mesh gearwheels and a fourth clutch, placing second coupling means between the primary shaft and the sun gear of the planetary gearset, exclusive of the first coupling means formed by the first clutch and the input train, the gearbox is provided with two further gear ratios, so that it features five gear ratios defined by respective combinations of pairs of said four clutches.

Depending on whether one of the two speed ratios between the sun gear of the planetary gearset and the primary shaft resulting from the two coupling means between these elements is less than or equal to unity and the other is equal to or more than unity, the fourth and/or fifth gear ratios are respectively less than one-to-one and more than one-to-one (overdrive), or direct drive ratios, in this context direct drive meaning rotation of the planetary gearset as a whole.

By adding to the previous five-speed gearbox a first and/or a second brake respectively operating on the sun gear and/or the planet carrier of the planetary gearset, the gearbox is respectively provided with a sixth gear ratio and a first braked neutral setting by combination of the first brake with the second and the third clutches and/or two reverse gear ratios and a second braked neutral setting by combination of the second brake with the first, the fourth and the third clutches, and finally a third braked neutral setting by combination of the first brake with the second brake.

By splitting the primary or input shaft of each of the aforementioned gearboxes to form a first primary shaft receiving the first clutch and constituting a first input and a second primary shaft receiving the second clutch and constituting a second input, each of the gearboxes is provided with two separate coaxial inputs.

With this arrangement, which is applicable to all these gearboxes, the gearbox may be coupled to two different coaxial power sources. To give an example of this, based on a single power source, there may be interposed between the gearbox and the single power source a slip-type coupling unit such as a fluid coupling or a hydraulic torque converter, the first input being coupled to the driven part of the slip-type unit constituting the first of the two coaxial power sources whereas the second input is coupled to the driving part constituting the second. This introduces, based on a single power source, a series of gear ratios subject to slip and a series of gear ratios not subject to slip.

When the gearbox has four forward gear ratios and one reverse gear ratio, for example, the first and third forward gear ratios and the reverse gear ratio are subject to slip whereas the second and fourth forward gear ratios are not subject to slip.

Also, if a freewheel is interposed between the two primary shafts so that the first primary shaft cannot rotate faster than the second, then the gear ratios subject to slip are in fact subject to slip only in traction or during motor braking. Thus the gearbox with four forward gear ratios and one reverse gear ratio also has the third forward gear ratio not subject to slip in traction and the first forward gear ratio and the reverse gear ratio not subject to slip during motor braking.

The characteristics and advantages of the invention will emerge from the following description given by way of example with reference to the appended drawings.

DESCRIPTION OF THE PREFERRED EMBODIMENTS

Figure 1:
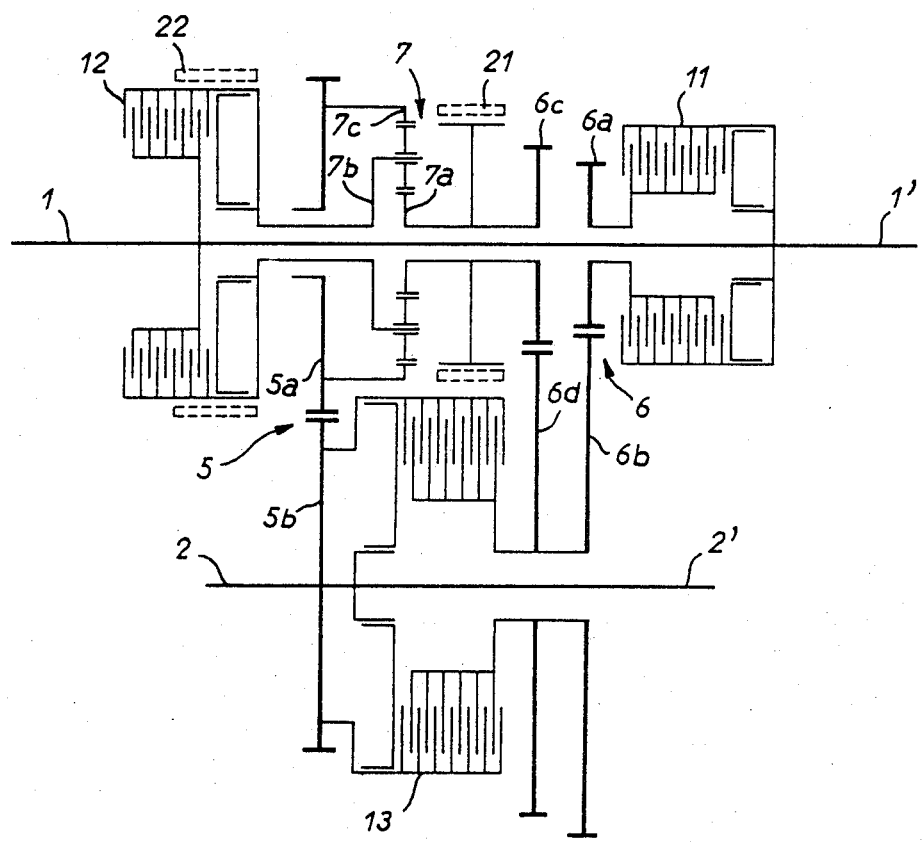
FIG. 1 is a schematic representation of the basic gearbox in accordance with the invention, with an input gear train the speed ratio of which is less than one-to-one.

In the selected embodiment shown in FIG. 1 a basic gearbox comprises, in a casing that is not shown, an input or primary shaft $1,1'$ and an output or secondary shaft $2,2'$, these two shafts being parallel. On these shafts are disposed on the one hand a single gear train of two constant-mesh gearwheels; this is the output train 5 with one gear $5a$ located on the primary shaft $1,1'$ and one gear $5b$ fastened to the secondary shaft $2,2'$, determining between them an output speed ratio $5a/5b$; and on the other hand a double gear train of four constant-mesh gearwheels; this is the input train 6 with two interlocked gears $6b$ and $6d$ both located on the secondary shaft $2,2'$ and two adjacent gears $6a$ and $6c$ both located on the primary shaft $1,1'$, determining between them an input speed ratio $6a/6b$:$6c/6d$. The gearbox further comprises a three-element planetary gearset 7 concentric with the primary shaft and comprising a sun gear $7a$ fastened to the gear $6c$ of the input train 6, a planet carrier $7b$ and a ring gear $7c$ fastened to the gear $5a$ of the output train 5.

The basic gearbox further comprises a first clutch 11 located on the primary shaft $1,1'$ and interposed between it and the gear $6a$ of the input train 6, a second clutch 12 located on the primary shaft $1,1'$ and interposed between it and the planet carrier $7b$ of the planetary gearset 7, and a third clutch 13 located on the secondary shaft $2,2'$ and interposed between it and the two interlocked gears $6b$ and $6d$ of the input train 6.

As a general rule, the individual speed ratios $6a/6b$ and $6c/6d$ of the meshing gears of the input train 6 are both selected to be less than the output speed ratio $5a/5b$. Also, in the case of FIG. 1 the input speed ratio $6a/6b$:$6c/6d$ is chosen to be less than unity, so that the speed ratios of all the meshing gears follow on in the order $5a/5b$, $6c/6d$, $6a/6b$ apparent in the figure.

With this form of construction the basic gearbox features three forward gear ratios obtained by combining pairs of the three clutches, motion being transmitted in the following manner:

In first gear the first clutch 11 and the third clutch 13 are engaged. Transmission is effected only by the pair of gears $6a,6b$ at the corresponding speed ratio $6a/6b$, while the planetary gearset 7, the output train 5 and the pair of gears $6c,6d$ all rotate freely.

In second gear the second clutch 12 and the third clutch 13 are engaged. Transmission is effected by the planetary gearset 7, the output train 5 and the pair of gears 6c,6d at a speed ratio between the corresponding speed ratios 5a/5b and 6c/6d, while the pair of gears 6a,6b rotate freely.

In third gear the first clutch 11 and the second clutch 12 are engaged. Transmission is effected by the combination of the planetary gearset 7, the output train 5 and the input train 6 at a speed ratio higher than the output speed ratio 5a/5b, given that the input speed ratio 6a/6b:6c/6d is less than unity.

The third gear ratio is then by convention referred to as an overdrive ratio, with reference to a direct drive ratio to be understood in this context as corresponding to the rotation of the planetary gearset 7 as a whole.

Using the same form of construction one or two brakes may be added to the basic gearbox, with a fixed part anchored to the casing. A first brake 21 can immobilize the sun gear 7a of the planetary gearset 7 and a second brake 22 can immobilize the planet carrier 7b of the planetary gearset 7.

With these additions the basic gearbox acquires a fourth forward gear ratio, a reverse gear ratio and three braked neutral settings by combinations of pairs of the two brakes and three clutches, excluding combinations of the first brake 21 with the first clutch 11 and of the second brake 22 with the second clutch 12, these resulting in two prohibited conditions where the gearbox input is immobilized and the output is free.

The transmission of motion through the new combinations is effected in the following manner:

In fourth gear the first brake 21 and the second clutch 12 are engaged. The transmission is effected by the planetary gearset 7 at its overdrive speed ratio with the sun gear 7a immobilized, followed by the output train 5 at its output speed ratio 5a/5b.

In reverse gear the second brake 22 and the first clutch 11 are engaged. Transmission is effected by the input train 6 at its input speed ratio 6a/6b:6c/6d, followed by the planetary gearset 7 at its reverse speed ratio with the planet carrier 7b immobilized, followed by the output train 5 at its output speed ratio 5a/5b.

In the braked neutral setting the first brake 21 and the third clutch 13 or the second brake 22 and the third clutch 13 or the first brake 21 and the second brake 22 are engaged. In all three cases the primary shaft 1,1' rotates freely while the input train 6, the planetary gearset 7, the output train 5 and the secondary shaft 2,2' are immobilized.

Logic table 1 summarizes in detail the eight combinations thus obtained:

LOGIC TABLE 1

| CLUTCHES AND BRAKES | REV 1 | BRAKED NEUTRAL 3 | BRAKED NEUTRAL 2 | BRAKED NEUTRAL 1 | FORWARD GEAR RATIO 1 | FORWARD GEAR RATIO 2 | FORWARD GEAR RATIO 3 | FORWARD GEAR RATIO 4 |
|---|---|---|---|---|---|---|---|---|
| 1st clutch 11 | — | | | | — | | — | |
| 2nd clutch 12 | | | | | | | | |
| 3rd clutch 13 | | | | | | | | |
| 1st brake 21 | | — | | — | | | | — |
| 2nd brake 22 | | | — | — | | | | |

This table shows the symmetry and periodicity of the operation of the clutches and brakes and also that the change from each combination to the next, or the next but one, is obtained throughout the whole range by changing only one of the two units engaged, meaning with single operating sequences only.

Figure 2:
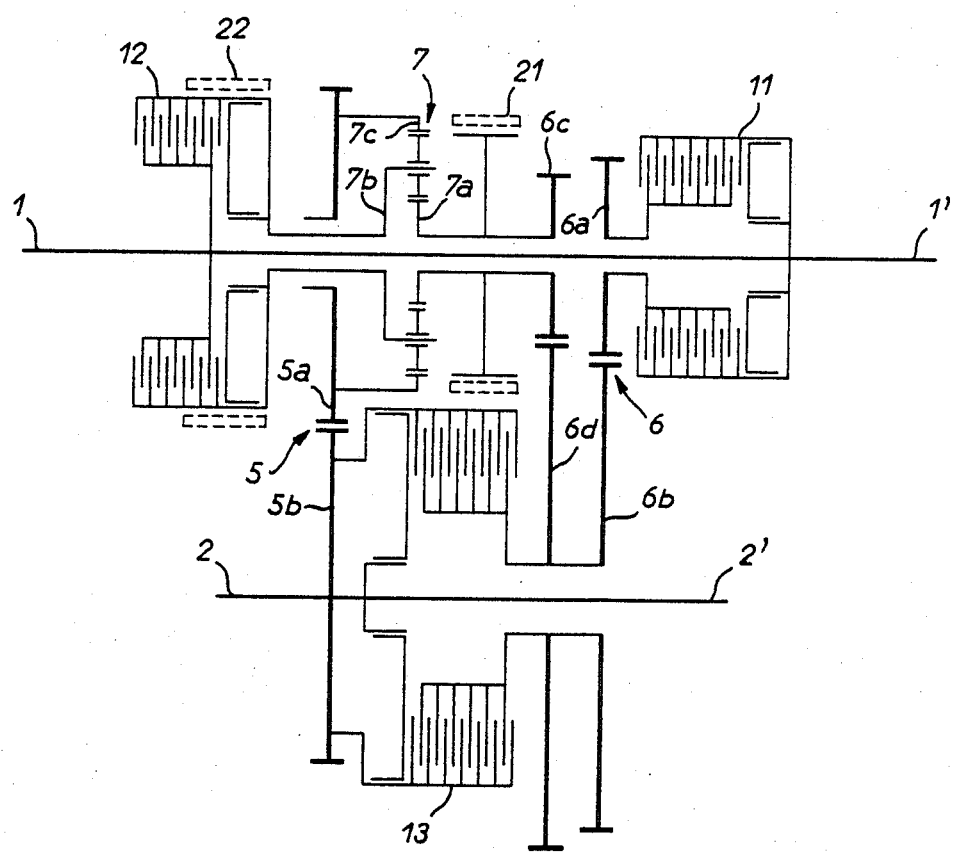
FIG. 2 shows a variation on the gearbox of FIG. 1, with an input gear train the speed ratio of which is more than one-to-one.
Figure 3:
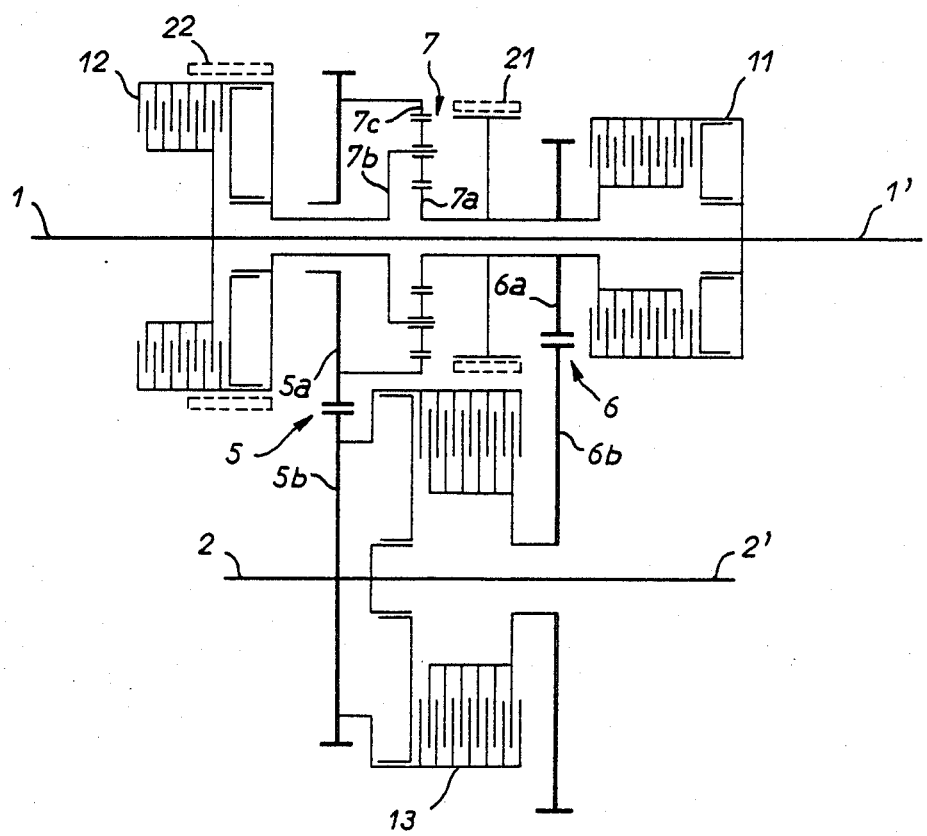
FIG. 3 shows another variation on FIG. 1, with a unity speed ratio input gear train reduced to a single train.

Reference should now be had to FIGS. 2 and 3 which show variations on FIG. 1. In FIG. 1 the input speed ratio 6a/6b:6c/6d is less than unity so that the third gear ratio is an overdrive ratio relative to a direct drive ratio. In the variation shown in FIG. 2 this speed ratio is greater than unity, so that the third gear ratio is less than one-to-one. Finally, in the variation shown in FIG. 3 the input speed ratio is equal to unity so that the third gear ratio is a direct drive ratio. In this case, the double gear train of four gears 6a, 6b, 6c, 6d may be reduced to a single gear train of two gears 6a, 6b, the respective pairs of gears 6a and 6c, 6b and 6d being then combined into one, as apparent in the figure.

It should be appreciated that there is an extremely flexible choice for gear ratios by simply varying the input train 6, without any modification of the planetary gearset 7 or of the detailed combinations as summarized in logic table 1.

Figure 4:
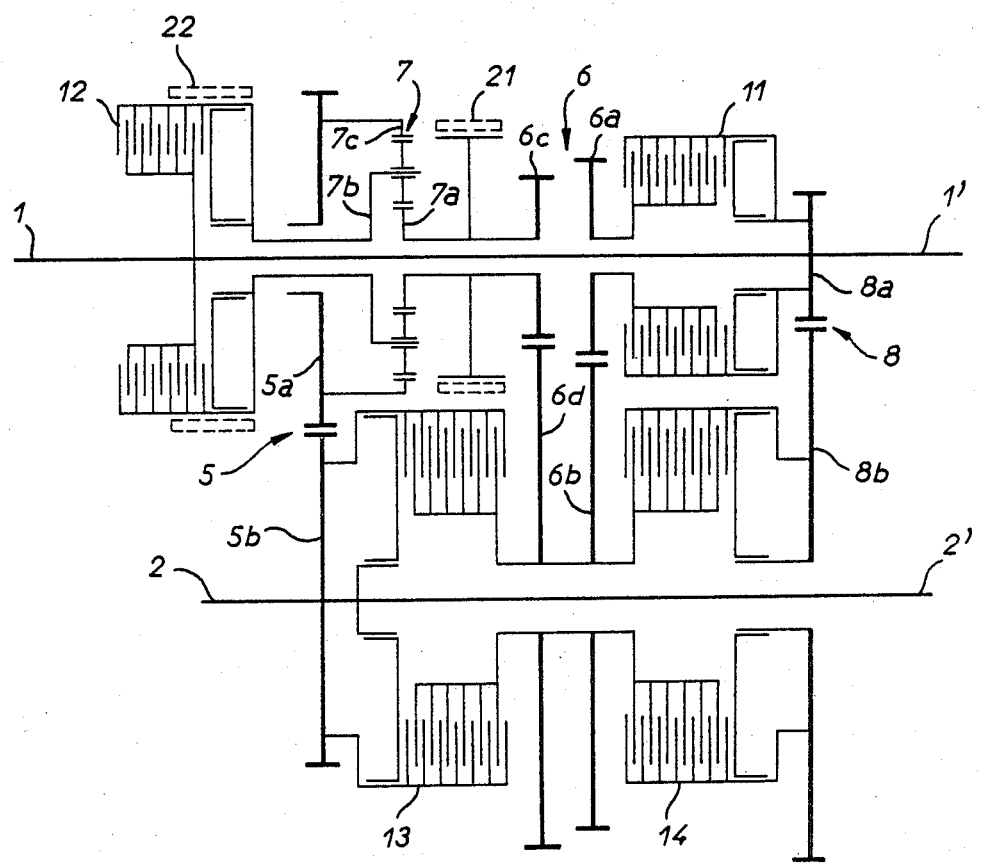
FIG. 4 is a schematic representation of a gearbox derived from that of FIG. 2 by adding a supplementary gear train.
Figure 5:
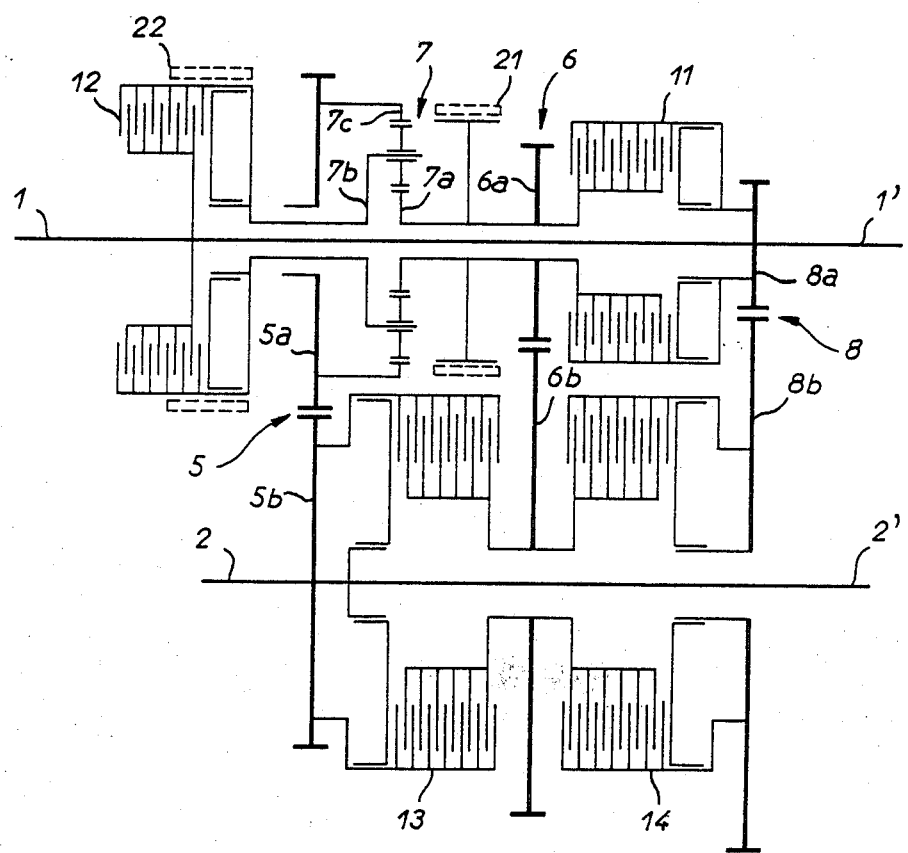
FIGS. 5 and 6 show variations on the FIG. 4 gearbox derived from the FIG. 3 gearbox.
Figure 6:
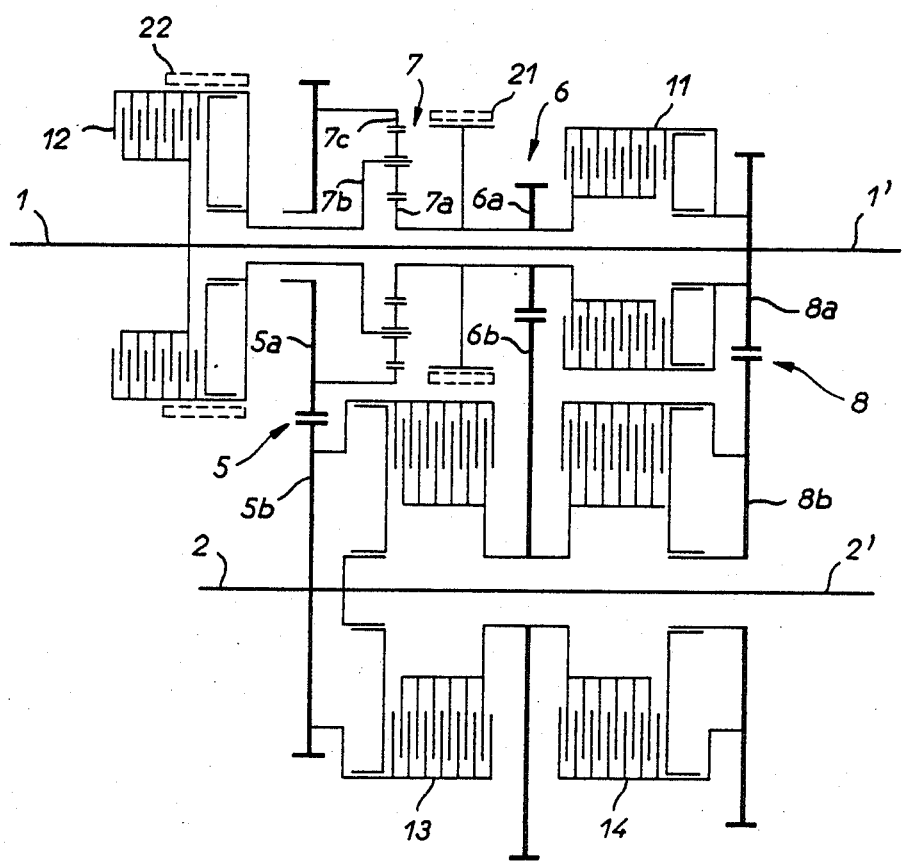

Reference should now be had to FIGS. 4, 5 and 6 which are schematic representations of gearboxes derived from the basic gearbox of FIGS. 1, 2 and 3, by adding a supplementary gear train of constant-mesh gearwheels or supplementary train 8 and a fourth clutch 14, forming second coupling means between the primary shaft 1,1' and the sun gear 7a of the planetary gearset 7 at a second or supplementary speed ratio different from the speed ratio of the input train 6.

All parts common to the gearboxes shown in FIGS. 1 through 6 naturally carry the same reference numbers. In the selected embodiment shown in supplementary train 8 is a single train consisting of a gear 8a fastened to the primary shaft 1,1' and a gear 8b located on the secondary shaft 2,2' and the fourth clutch 14 is located on the secondary shaft 2,2' and interposed between the gear 8b and the gear 6b of the input train 6. This arrangement determines the supplementary speed ratio 8a/8b:6c/6d.

As a general rule the individual speed ratio 8a/8b of the supplementary train 8 is chosen to be less than the output speed ratio 5a/5b, like the individual speed ratios 6a/6b and 6c/6d of the input train 6. The second coupling means formed by the clutch 14 and the supplementary train 8 are naturally exclusive of the first coupling means formed by the clutch 11 and the input train 6 and prohibit the combination of these two clutches for which the gearbox input would be immobilized and the output free.

With these additions the basic gearbox features two additional gear ratios by combination of the fourth clutch 14 with the third clutch 13 and the second clutch 12, producing a gearbox with four clutches and five gear ratios obtained by combining pairs of the four clutches, excluding the prohibited combination.

By further adding the brakes 21 and 22, this four-clutch, five-speed gearbox acquires a sixth forward gear ratio, two reverse gear ratios and three braked neutral settings by combinations of pairs of the two brakes and four clutches, excluding combinations of the first brake 21 with the first clutch 11 and the fourth clutch 14 and of the second brake 22 with the second clutch 12, resulting in the two prohibited conditions of the basic gearbox, plus a further prohibited condition, in all of which the gearbox input is immobilized and the output is free.

To give an example, in the case of the gearbox shown in FIG. 4 and derived from that shown in FIG. 2, the individual speed ratios of all the meshing gears follow on in the order apparent in the figure: 5a/5b, 6a/6b, 6c/6d, 8a/8b. The input speed ratio 6a/6b:6c/6d is more than unity as in FIG. 2, whereas the supplementary speed ratio 8a/8b:6c/6d is less than unity like the input speed ratio in FIG. 1. Transmission is effected in the following manner:

In first gear the fourth clutch 14 and the third clutch 13 are engaged. Transmission is effected only by the pair of gears 8a,8b at the corresponding speed ratio 8a/8b, while the planetary gearset 7, the output train 5 and the input train 6 rotate freely.

The second, third and fourth gear ratios are respectively the same as the first, second and third gear ratios of the basic gearbox, with the supplementary train 8 rotating freely. Given that the input speed ratio 6a/6b:6c/6d is more than unity, the fourth gear ratio is less than one-to-one.

In fifth gear the fourth clutch 14 and the second clutch 12 are engaged. Transmission is effected by the combination of the planetary gearset 7, The output train 5, the pair of gears 6c,6d and the supplementary train 8, whereas the pair of gears 6a,6b rotate freely. Given that the supplementary speed ratio 8a/8b:6c/6d is less than unity, this fifth gear ratio in an overdrive ratio.

The sixth gear is the same as the fourth gear added to the basic gearbox by the first brake 21.

In the first reverse gear ratio the fourth clutch 14 and the second brake 22 are engaged. Transmission is effected by the supplementary train 8 followed by the pair of gears 6c,6d at the supplementary speed ratio 8a/8b:6c/6d, followed by the planetary gearset 7 at its reverse speed ratio with the planet carrier 7b immobilized, followed by the output train 5 at its output speed ratio 5a/5b, whereas the pair of gears 6a,6b rotate freely.

The second reverse gear ratio is the same as the reverse gear ratio added to the basic gearbox by the second brake 22, while the supplementary train 8 rotates freely.

The three braked neutral settings are the same as those added to the basic gearbox by the two brakes 21 and 22, whereas the supplementary train 8 rotates freely with the primary shaft 1,1'.

Logic table 2 summarizes in detail the eleven combinations thus obtained:

LOGIC TABLE 2

| CLUTCHES AND BRAKES | REV | | BRAKED NEUTRAL | | | FORWARD GEAR RATIO | | | | | |
|---|---|---|---|---|---|---|---|---|---|---|---|
| | 2 | 1 | 3 | 2 | 1 | 1 | 2 | 3 | 4 | 5 | 6 |
| 4th clutch 14 | — | | | | | — | | | | — | |
| 1st clutch 11 | | — | | | | | — | | | — | |
| 2nd clutch 12 | | | | | | | | | | | |
| 3rd clutch 13 | | | | | | | | | | | |
| 1st brake 21 | | | — | | — | | | | | | — |
| 2nd brake 22 | | | | | | | | | | | |

Like logic table 1, logic table 2 shows the symmetry and periodicity of operation of the clutches and brakes and also that the change from each combination to the next, or the next but one, is obtained throughout the whole range by changing only one of the two units engaged, meaning with single operating sequences only.

The gearboxes shown in FIGS. 5 and 6 are derived from the basic gearbox shown in FIG. 3 comprising an input train 6 reduced to a single train and a third gear ratio which is a direct drive ratio. In the case of FIG. 5 the individual speed ratios of all the meshing gears follow on in the order apparent in the figure 5a/5b, 6a/6b, 8a/8b and the supplementary speed ratio 8a/8b:6a/6b is less than unity. The added gear ratios are the same as in FIG. 4, that is the first reverse gear ratio, the first and the fifth gear ratios, the latter being an overdrive ratio. The fourth gear ratio is a direct drive ratio. Logic table 2 applies without any alteration. In the case of FIG. 6 the speed ratios follow on in a different order 5a/5b, 8a/8b, 6a/6b and the supplementary speed ratio is more than unity. The added gear ratios become the second reverse gear ratio and the second and the fourth gear ratios, the latter being less than one-to-one. The fifth gear ratio is a direct drive ratio. Logic table 2 again applies without alteration except that the clutches 11 and 14 must be interchanged.

It will be understood that the complete range of choice provided by the supplementary train 8 is available for the supplementary gear ratios.

It will further be noted that all the gearboxes shown in FIGS. 1 through 6 have a common feature in that both the input shaft 1,1' and the output shaft 2,2' extend through them so that all have four input and output options offset relative to one another.

Figure 7:
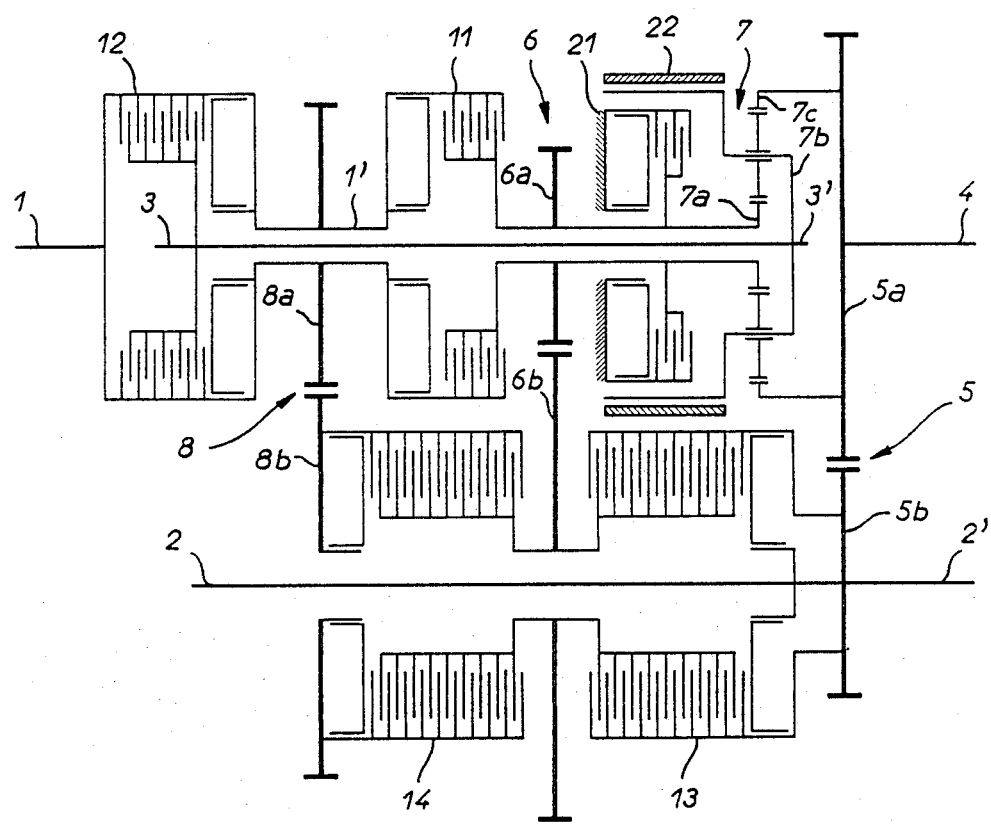
FIG. 7 shows a variation on FIG. 6, with an in-line output facility.

In the gearbox schematically represented in FIG. 7 and derived, for example, from that shown in FIG. 6, the primary shaft 1,1' does not extend through the gearbox. The clutch 12 is remote and coupled to the planet carrier 7b of the planetary gearset 7 by an auxiliary shaft 3,3', while an output half-shaft 4 fastened to the gear 5a of the output train 5 is added on the axis. With this form of construction the gearbox features an in-line output option, including full direct drive, together with two offset output options. In the case of FIG. 7 the fifth gear ratio is thus a complete direct drive to the output half-shaft 4.

It will be noted that the different representation of the brake 21 does not change anything else at all.

Figure 8:
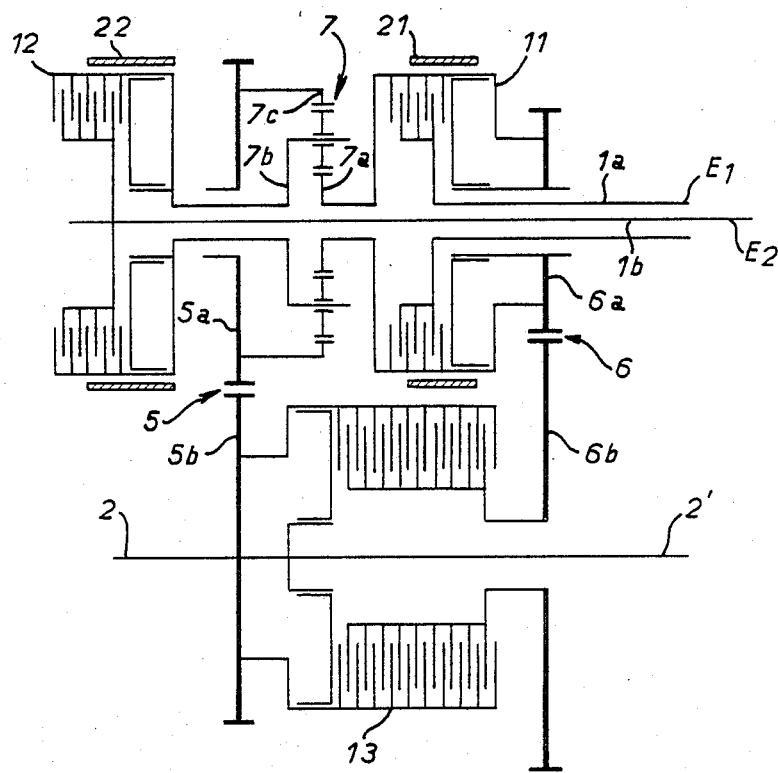
FIG. 8 is a schematic representation of a gearbox derived from that of FIG. 3, with the input split to provide two separate coaxial inputs.

Reference should now be had to FIG. 8, which is a schematic representation of a gearbox with two separate coaxial inputs E1, E2 derived from the basic gearbox as shown in FIGS. 1, 2, 3, and for simplicity from the variation shown in FIG. 3 where the third gear ratio is a direct drive ratio, for example. To this end the primary or input shaft 1,1' of the basic gearbox is split to form a first primary shaft 1a receiving the first clutch 11 and constituting the first input E1 and a second primary shaft 1b receiving the second clutch 12 and constituting the second input E2, the two gearbox inputs E1 and E2 being coaxial and separate and adapted to be coupled to two respective different power sources. Logic table 1 immediately identifies the combinations dependent on the one or the other of these two power sources.

Figure 9:
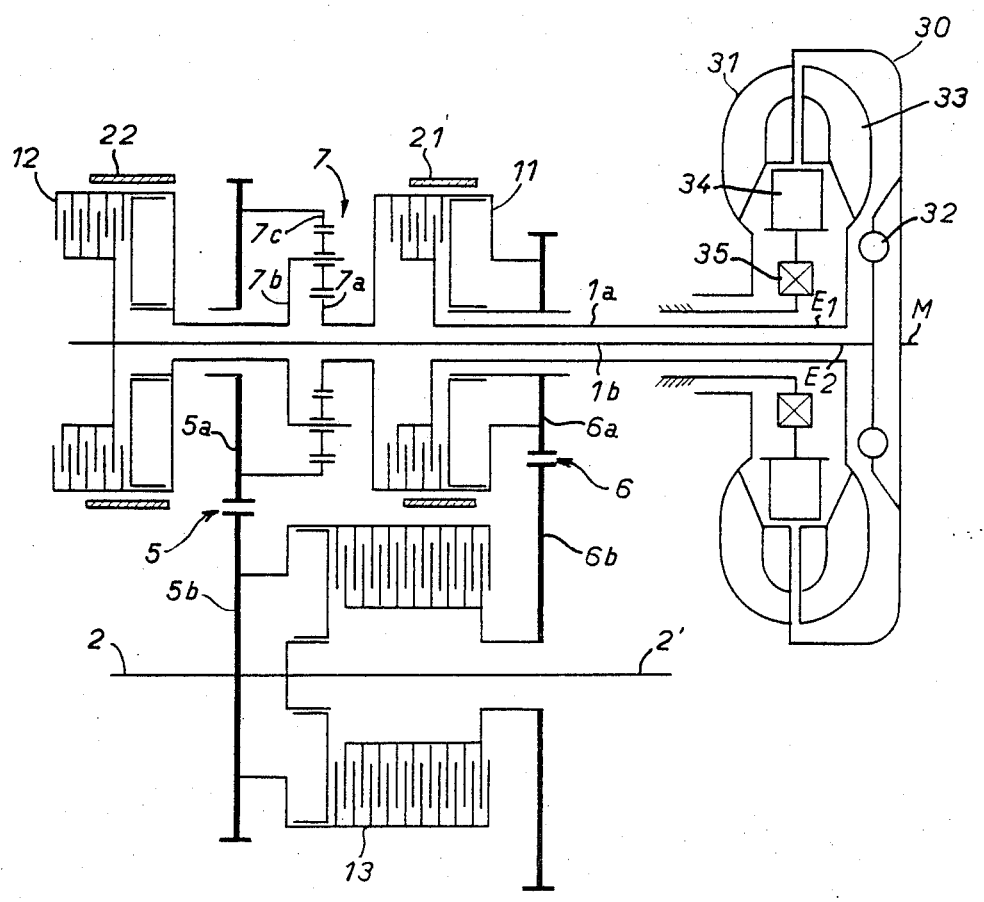
FIG. 9 shows a gearbox as in FIG. 8 driven by a hydraulic torque converter.

FIG. 9 shows one example of a gearbox of this kind driven by a hydraulic torque converter 30 from a single power source M. In a manner that is known per se, the torque converter 30 comprises an impeller 31 and a torsional vibration damper 32 connected to the power source M, a turbine 33 subject to slip, a stator 34 and a freewheel 35. The first input E1 of the gearbox is coupled to the turbine 33 and is referred to as the hydrokinetic input whereas the second input E2 is connected to the vibration damper 32 and is referred to as the mechanical input.

With an arrangement of this kind the first and the reverse gear ratios are hydrokinetic, the second and the fourth gear ratios are mechanical and the third gear ratio is compound, while the load on the torque converter 30 is reversed and significantly reduced in this latter gear ratio by virtue of the planetary gearset 7.

Figure 10:
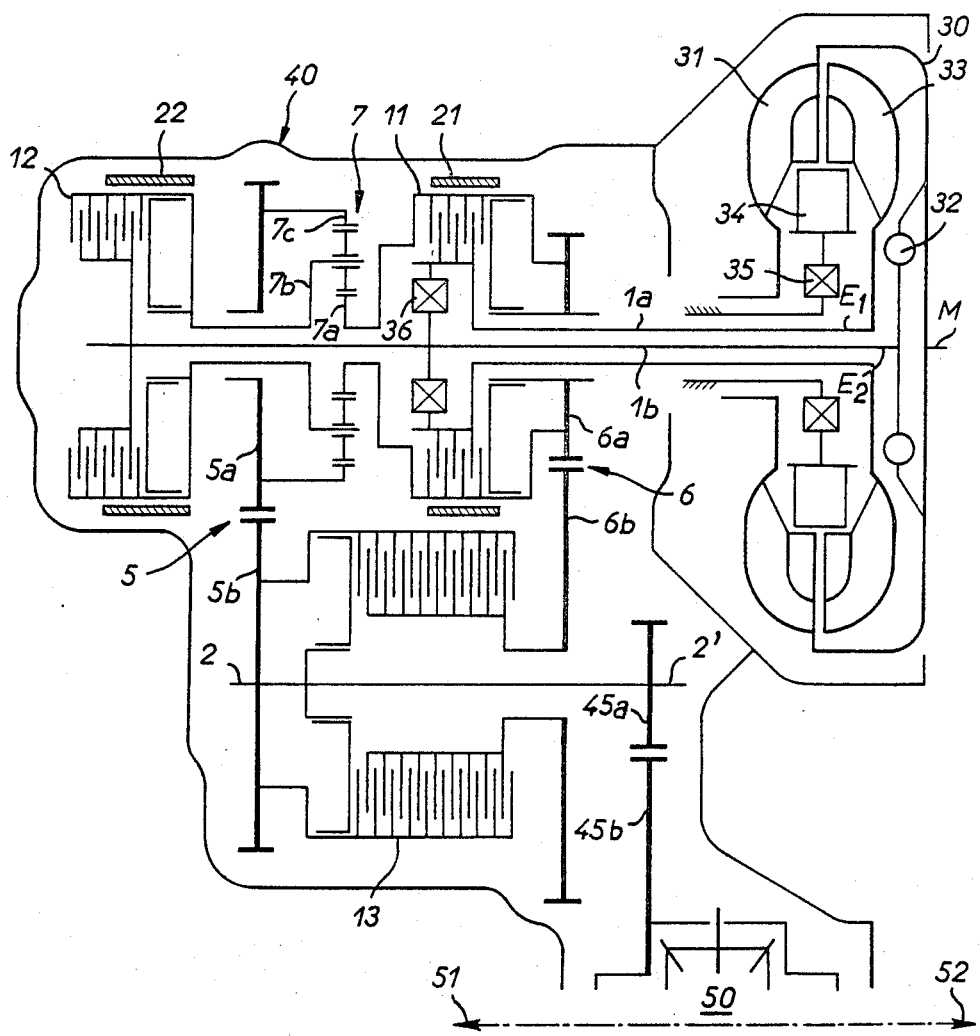
FIG. 10 shows a gearbox as in FIG. 9 with a freewheel between the two inputs, in an adaptation for transverse engine mounting with the differential integrated into a common casing.

FIG. 10 is a schematic representation of one example showing how to adapt this gearbox to a transverse engine with a common casing 40 integrating the embodiment as per FIG. 9, the final drive gears 45a, 45b, the differential 50 and the two outputs 51 and 52 to the driving wheels of the vehicle. In addition, a freewheel 36 is interposed between the two primary shafts 1a and 1b to prevent the shaft 1a rotation faster than the shaft 1b, the gear ratios subject to slip then being subject to slip only in traction or only during motor braking.

Table 1, in which the symbol * shows the cooperation of the freewheel 36, summarizes the nature of each of the gear ratios thus obtained:

TABLE 1

|  | TRACTION | MOTOR BRAKING |
|---|---|---|
| 1st gear | Hydrokinetic | Mechanical* |
| 2nd gear | Mechanical | Mechanical |
| 3rd gear | Mechanical* | Compound |
| 4th gear | Mechanical | Mechanical |
| Reverse | Hydrokinetic | Mechanical* |

It will be appreciated that the converter 30 now serves only for starting in first gear and reverse gear and is eliminated in the other free gears and during motor braking, where residual slippage in the compound third gear is negligible.

Figure 11:
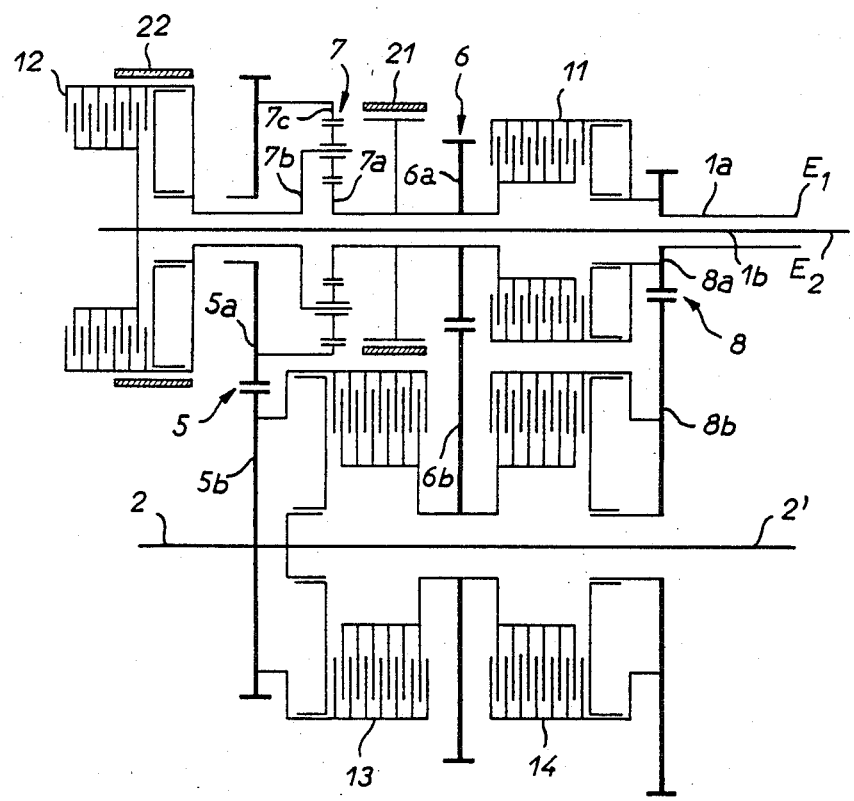
FIG. 11 is a schematic representation of a gearbox derived from that of FIG. 5, with the input split to provide two separate coaxial inputs.

Reference should now be had to FIG. 11 which shows the same development of a gearbox with two separate coaxial inputs E1, E2 as in FIG. 8, but based on the gearboxes of FIGS. 4 through 6, and for simplicity of the variation of FIG. 5 in which the fourth gear ratio is a direct drive ratio, for example. Seen in FIG. 11 are the first primary shaft 1a receiving the first clutch 11 and constituting the first input E1 and the second primary shaft 1b receiving the second clutch 12 and constituting the second input E2, the two gearbox inputs E1 and E2 being coaxial and separate and adapted to be coupled to two respective different power sources. Logic table 2 immediately identifies the combinations dependent on the one or the other of these two power sources.

Figure 12:
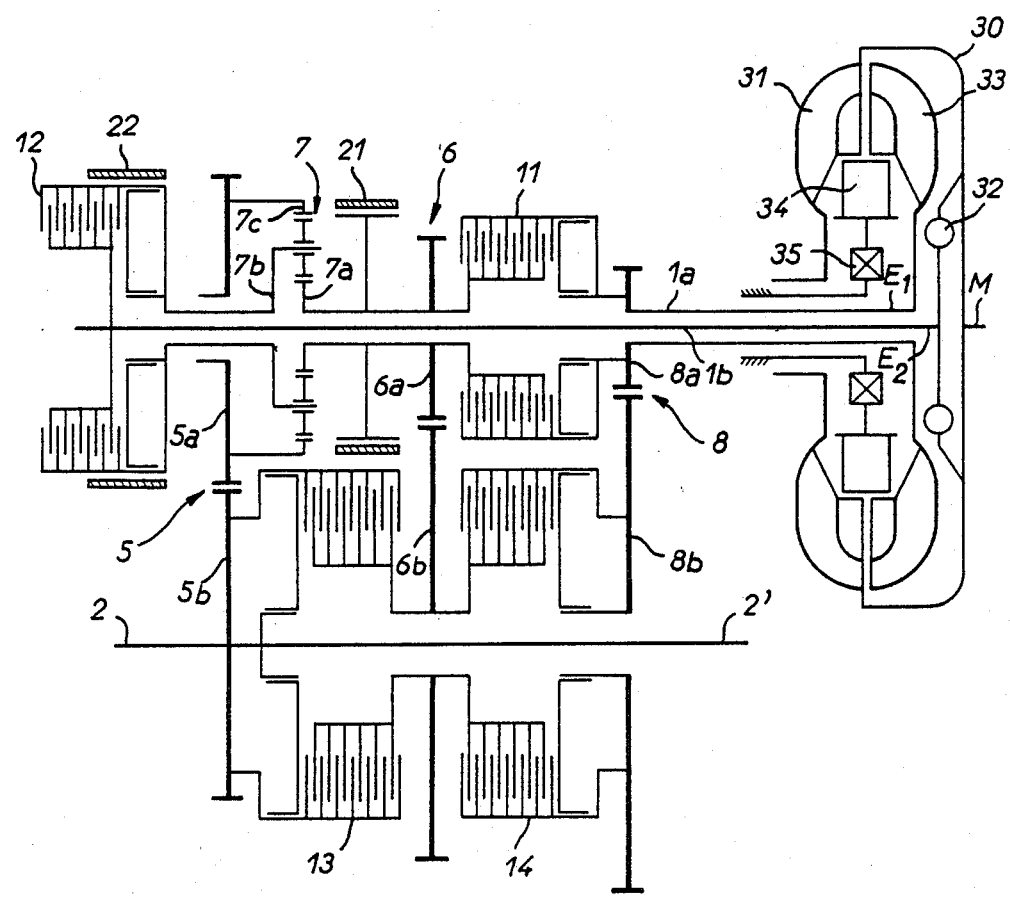
FIG. 12 shows a gearbox as in FIG. 11 driven by a hydraulic torque converter.

FIG. 12 shows an example of a gearbox of this kind driven by a hydraulic torque converter 30 from a single power source M, with the same arrangement as in FIG. 9. The two reverse gear ratios and the first and second gear ratios are hydrokinetic, the third and sixth gear ratios are mechanical and the fourth and fifth gear ratios are compound, while the load on the torque converter 30 is reversed and significantly reduced in these latter two gear ratios by virtue of the planetary gearset 7.

Figure 13:
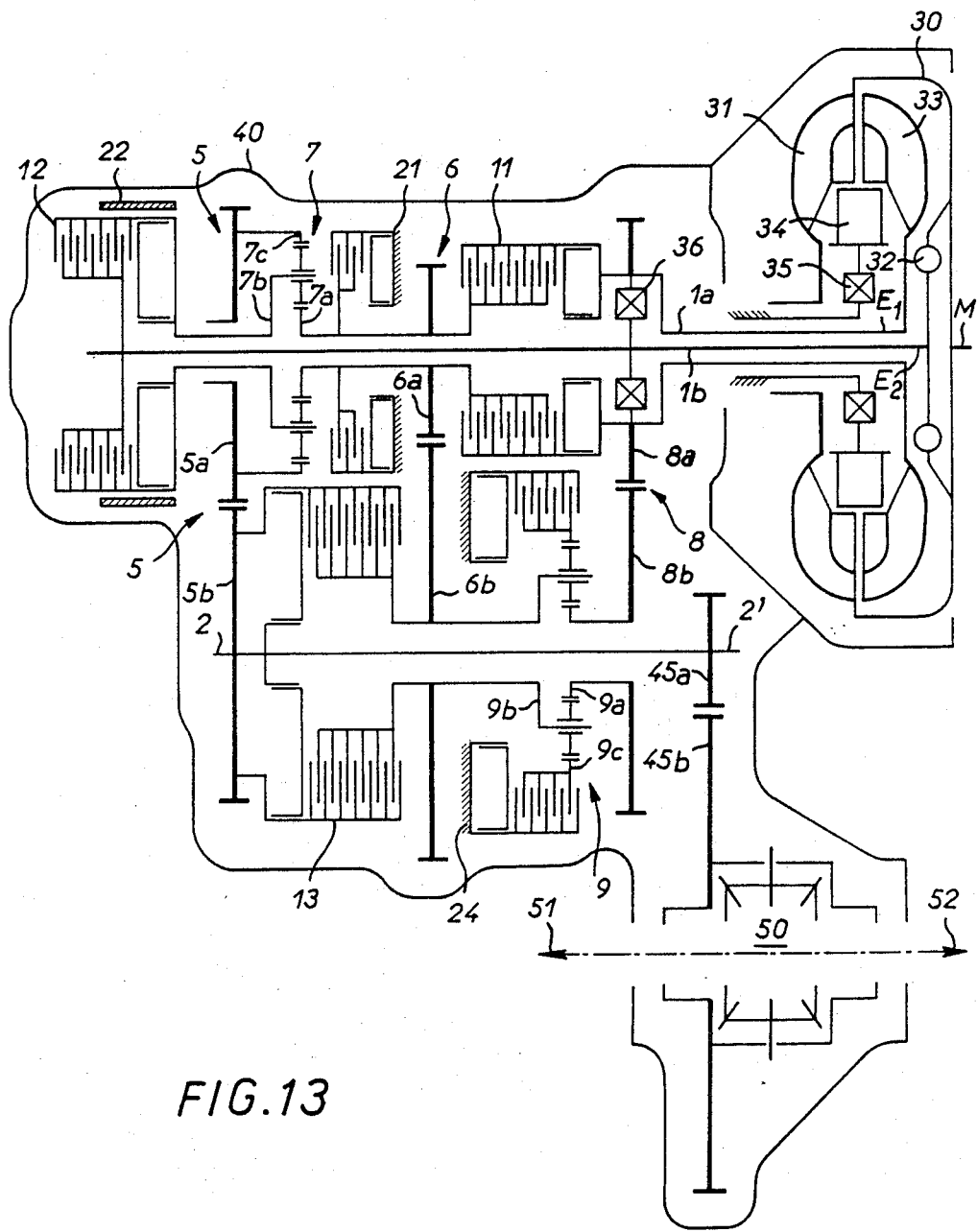
FIG. 13 is a schematic representation of a gearbox derived from that of FIG. 12 with a freewheel between the two inputs, in an adaptation for transverse engine mounting with the differential integrated into a common casing.

FIG. 13 is a schematic representation of one example showing how to adapt this gearbox to a transverse engine with the same arrangement as in FIG. 10. The reader will recognize in particular the torque converter 30, the common casing 40, the final drive gears 45a, 45b, the differential 50 and the two outputs 51 and 52 to the driving wheels of the vehicle. The reader will also recognize the freewheel 36 interposed between the two primary shafts 1a and 1b to prevent the shaft 1a rotating faster than the shaft 1b, the gear ratios subject to slip then being subject to slip only in traction or only during motor braking.

Differing in this respect from FIG. 12, and this in order to facilitate integration of the assembly into the common casing 40, the clutch 14 is replaced in a manner that is known per se by an auxiliary planetary gearset 9 with three elements and a brake 24; the auxiliary planetary gearset 9 has a sun gear 9a fastened to the gear 8b of the supplementary train 8, a planet carrier 9b fastened to the gear 6b of the input train 6, and a ring gear 9b controlled by the brake 24, the gears 8a and 8b of the supplementary train 8 being adjusted as necessary.

An embodiment of this kind naturally does not modify in any way either the gear ratios or the logical combinations.

Table 2, in which the symbol * shows the cooperation of the freewheel 36, summarizes the nature of each of the gear ratios thus obtained:

TABLE 2

|  | TRACTION | MOTOR BRAKING |
|---|---|---|
| 1st gear | Hydrokinetic | Mechanical* |
| 2nd gear | Hydrokinetic | Mechanical* |
| 3rd gear | Mechanical | Mechanical |
| 4th gear | Mechanical* | Compound |
| 5th gear | Mechanical* | Compound |
| 6th gear | Mechanical | Mechanical |
| Reverse 1 | Hydrokinetic | Mechanical* |
| Reverse 2 | Hydrokinetic | Mechanical* |

It will be appreciated that the converter 30 now serves only for starting in first gear and second gear and in the two reverse gears and is eliminated in the other four gears and during motor braking, where residual slippage in the compound fourth and fifth gear ratios is negligible.

As with FIG. 7, it will be noted that the different representation of the brake 21 does not change anything else at all.

A number of examples will now be given of the gearing and gearbox ratios, limited for the sake of simplicity to the gearboxes with three or four forward gear ratios and one reverse gear ratio with the third gear ratio a direct drive ratio, and then to gearboxes with six forward gear ratios and two reverse gear ratios with the fourth gear ratio a direct drive or a less than unity ratio, or the fifth gear ratio a direct drive ratio.

Example 1

Gearbox with three forward gear ratios, one reverse ratio. Diagrams of FIGS. 3, 8, 9, 10, with only the brake 22 used.

| Parallel shafts | | Planetary gearset | |
|---|---|---|---|
| Gear 5a | 47 teeth | Sun gear 7a | 39 teeth |
| Gear 5b | 47 teeth | Ring gear 7c | 81 teeth |
| Gear 6a | 25 teeth | Planet pinions | 21 teeth |
| Gear 6b | 69 teeth | | |

| Gear | Ratio | Step |
|---|---|---|
| 1st | 0.362 | |
| 2nd | 0.636 | 1.756 |

| | | |
|---|---|---|
| 3rd (direct drive) | 1.000 | 1.572 |
| Reverse | 0.481 | |

Example 2

Gearbox with three forward gear ratios, one reverse ratio. Diagrams of FIGS. 3, 8, 9, 10, with only the brake 22 used.

| Parallel shafts | | Planetary gearset | |
|---|---|---|---|
| Gear 5a | 47 teeth | Sun gear 7a | 39 teeth |
| Gear 5b | 47 teeth | Ring gear 7c | 81 teeth |
| Gear 6a | 27 teeth | Planet pinions | 21 teeth |
| Gear 6b | 67 teeth | | |

| Gear | Ratio | Step |
|---|---|---|
| 1st | 0.403 | |
| 2nd | 0.675 | 1.675 |
| 3rd (direct drive) | 1.000 | 1.481 |
| Reverse | 0.481 | |

Example 3

Gearbox with four forward gear ratios, one reverse ratio. Diagrams of FIGS. 3, 8, 9, 10, with both brakes 21 and 22 used.

| Parallel shafts | | Planetary gearset | |
|---|---|---|---|
| Gear 5a- | 47 teeth | Sun gear 7a | 31 teeth |
| Gear 5b | 47 teeth | Ring gear 7c | 89 teeth |
| Gear 6a | 27 teeth | Planet pinions | 29 teeth |
| Gear 6b | 67 teeth | | |

| Gear | Ratio | Step |
|---|---|---|
| 1st | 0.403 | |
| 2nd | 0.723 | 1.795 |
| 3rd (direct drive) | 1.000 | 1.383 |
| 4th | 1.348 | 1.348 |
| Reverse | 0.348 | |

These first three examples demonstrate both the extreme flexibility and the very high degree of standardization of a construction in accordance with the invention. From a single structure, and with only very slight variations in the gearing arrangements, it is possible to reproduce easily all gear ratios of conventional automatic gearboxes with three or four gear ratios for passenger cars usually requiring different structures (Ravigneaux trains, Simpson trains, etc).

Example 4

Gearbox with six forward gear ratios, two reverse ratios. Diagrams of FIG. 4, with both brakes 21 and 22 used.

| Parallel shafts | | Planetary gearset | |
|---|---|---|---|
| Gear 5a | 47 teeth | Sun gear 7a | 39 teeth |
| Gear 5b | 47 teeth | Ring gear 7c | 81 teeth |
| Gear 6a | 26 teeth | Planet pinions | 21 teeth |
| Gear 6b | 54 teeth | | |
| Gear 6c | 24 teeth | | |
| Gear 6d | 66 teeth | | |
| Gear 8a | 20 teeth | | |
| Gear 8b | 73 teeth | | |

| Gear | Ratio | Step |
|---|---|---|
| 1st | 0.274 | |
| 2nd | 0.481 | 1.755 |
| 3rd | 0.637 | 1.325 |
| 4th (less than unity) | 0.844 | 1.325 |
| 5th (overdrive) | 1.119 | 1.325 |
| 6th | 1.481 | 1.325 |
| Reverse 1 | 0.363 | |
| Reverse 2 | 0.637 | 1.755 |

With an auxiliary planetary gearset 9 as in FIG. 13, also chosen to be identical to the planetary gearset 7 for reasons of standardization, exactly the same results would be achieved provided that the following adjustments were applied:

| Parallel shafts | | Auxiliary planetary gearset | |
|---|---|---|---|
| Gear 8a | 43 teeth | Sun gear 9a | 39 teeth |
| Gear 8b | 51 teeth | Ring gear 9c | 81 teeth |
| | | planet pinions | 21 teeth |

Example 5

Gearbox with six forward gear ratios, two reverse ratios. Diagrams of FIGS. 5, 11 and 12, with both brakes 21 and 22 used.

| Parallel shafts | | Planetary gearset | |
|---|---|---|---|
| Gear 5a | 42 teeth | Sun gear 7a | 40 teeth |
| Gear 5b | 42 teeth | Ring gear 7c | 80 teeth |
| Gear 6a | 28 teeth | Planet pinions | 20 teeth |
| Gear 6b | 56 teeth | | |
| Gear 8a | 17 teeth | | |
| Gear 8b | 68 teeth | | |

| Gear | Ratio | Step |
|---|---|---|
| 1st | 0.250 | |
| 2nd | 0.500 | 2.000 |
| 3rd | 0.750 | 1.500 |
| 4th (direct drive) | 1.000 | 1.333 |
| 5th | 1.250 | 1.250 |
| 6th | 1.500 | 1.200 |
| Reverse 1 | 0.250 | |
| Reverse 2 | 0.500 | 2.000 |

With an auxiliary planetary gearset 9 as in FIG. 13, also chosen to be identical to the planetary gearset 7 for reasons of standardization, exactly the same results would be achieved provided that the following adjustments were applied:

| Parallel shafts | | Auxiliary planetary gearset | |
|---|---|---|---|
| Gear 8a | 36 teeth | Sun gear 9a | 40 teeth |
| Gear 8b | 48 teeth | Ring gear 9c | 80 teeth |
| | | Planet pinions | 20 teeth |

Example 6

Gearbox with six forward gear ratios, two reverse gear ratios, in-line output. Diagram of FIG. 7 with both brakes 21 and 22 used.

| Parallel shafts | | Planetary gearset | |
|---|---|---|---|
| Gear 5a | 58 teeth | Sun gear 7a | 25 teeth |
| Gear 5b | 33 teeth | Ring gear 7c | 77 teeth |
| Gear 6a | 28 teeth | Planet pinions | 26 teeth |
| Gear 6b | 65 teeth | | |
| Gear 8a | 40 teeth | | |
| Gear 8b | 53 teeth | | |

| Gear | Ratio | Step |
|---|---|---|

-continued

|  |  |  |
|---|---|---|
| 1st | 0.245 |  |
| 2nd | 0.430 | 1.755 |
| 3rd | 0.570 | 1.325 |
| 4th | 0.755 | 1.325 |
| 5th (full direct drive) | 1.000 | 1.325 |
| 6th | 1.325 | 1.325 |
| Reverse 1 | 0.325 |  |
| Reverse 2 | 0.570 | 1.755 |

These further three examples demonstrate the remarkably adaptable character of a construction in accordance with the invention, a single structure and slight variations in the gearing arrangements making it always possible to implement gearboxes with up to six gear ratios in arithmetic, geometric or compound progression, which would otherwise require much more complicated structures either of the layshaft type or of the planetary type.

If an auxiliary planetary gearset 9 is used as in FIG. 13, this may easily be chosen as identical to the planetary gearset 7, further enhancing the very high degree of standardization of the construction in accordance with the invention.

In the examples, for reasons of simplicity, there have been chosen pairs of gears 5a,5b that are equal to each other, corresponding to a direct drive ratio of 1/1. It will be understood that this condition is in no way mandatory, all the individual speed ratios of the pairs of meshing gears such as 5a,5b, 6a,6b, 6c,6d, 8a,8b being able to be altered as a whole as in any conventional layshaft type gearbox, without modifying the steps of the gearbox.

The invention is of course not limited to the embodiments described and shown but encompasses any variant execution within the scope of the claims.

I claim:

1. Gearbox comprising a casing, parallel primary or input and secondary or output shafts in said casing, a single output gear train of constant-mesh gearwheels including a gearwheel fastened to said secondary shaft, an independent input gear train of constant-mesh gearwheels, a first control clutch and a second control clutch located on said primary shaft, a third control clutch located on said secondary shaft, said first and third control clutches respectively coupling said input train to said primary shaft and said secondary shaft, and a three-element planetary gearset concentric with said primary shaft and comprising a sun gear fastened to said input train, a planet carrier coupled to said primary shaft by said second clutch and a ring gear fastened to said output train, said control clutches being selectively operable in pairs to define three forward gear ratios.

2. Gearbox according to claim 1, further comprising a first brake for immobilizing said sun gear of said planetary gearset whereby the gearbox features a fourth gear ratio and a braked neutral setting by respective combinations of said first brake with said second control clutch and with said third control clutch.

3. Gearbox according to claim 1, further comprising a brake for immobilizing said planet carrier of said planetary gearset whereby the gearbox features a reverse gear ratio and a braked neutral setting by respective combinations of said brake with said first control clutch and with said third control clutch.

4. Gearbox according to claim 1, wherein the speed ratio of said input train between said sun gear of said planetary gearset and said first clutch is equal to unity whereby a third of said three gear ratios is a direct drive ratio and said input train comprises a single gear train.

5. Gearbox according to claim 1, further comprising a supplementary gear train of constant-mesh gearwheels and a fourth control clutch defining second coupling means between said primary shaft and said sun gear of said planetary gearset, said second coupling means being operable mutually exclusively of a first coupling means defined by said first control clutch and said input train, whereby the gearbox features two further gear ratios, that is to say a total of five gear ratios, by respective combinations of pairs of said four control clutches.

6. Gearbox according to claim 5, further comprising a first brake for immobilizing said sun gear of said planetary gearset whereby the gearbox features a sixth gear ratio and a first braked neutral setting by respective combinations of said first brake with said second clutch and with said third clutch.

7. Gearbox according to claim 5, further comprising a second brake for immobilizing said planet carrier of said planetary gearset whereby the gearbox features two reverse gear ratios and a second braked neutral setting by respective combinations of said second brake with said first clutch, with said fourth clutch and with said third clutch.

8. Gearbox according to claim 5, wherein one of the two speed ratios between said sun gear of said planetary gearset and said primary shaft due to said first and second coupling means between them is less than unity and the other of said two speed ratios is more than unity, a fourth gear ratio being less than one-to-one and a fifth gear ratio being an overdrive gear ratio.

9. Gearbox according to claim 5, wherein one of the two speed ratios between said sun gear of said planetary gearset and said primary shaft due to said first and second coupling means between them is equal to unity and the other of said two speed ratios is less than unity whereby said fourth gear ratio is a direct drive ratio and said input train comprising a single gear train.

10. Gearbox according to claim 5, wherein one of the two speed ratios between said sun gear of said planetary gearset and said primary shaft due to said first and second coupling means between them is equal to unity and the other of said two speed ratios is more than unity whereby said fifth gear ratio is a direct drive ratio and said input train comprising a single gear train.

11. Gearbox according to claim 5, wherein said primary shaft is split to constitute coaxial first and second primary shafts, said first primary shaft receiving said first clutch and constituting a first input of the gearbox and said second primary shaft receiving said second clutch and constituting a second input of the gearbox, whereby the gearbox features two separate coaxial inputs.

12. Gearbox according to claim 11, coupled to a power source by a slip-type coupling unit such as a fluid coupling or a hydraulic torque converter, wherein a first of said two separate coaxial inputs is coupled to a driven part of said coupling unit, being the part thereof subject to slip, and the second of said two separate coaxial inputs is coupled to a driving part of said coupling unit, whereby said first, second, fourth and fifth gear ratios and two optional reverse gear ratios are subject to slip and said third gear ratio and an optional sixth gear ratio are not subject to slip.

13. Gearbox according to claim 12, further comprising a freewheel interposed between said first and second primary shafts and adapted to prevent said first primary shaft rotating faster than said second primary shaft, whereby said fourth and fifth gear ratios are not subject to slip in traction and said first and second gear ratios and two optional reverse gear ratios are not subject to slip during motor braking.

14. Gearbox according to claim 1, wherein said primary and secondary shafts extend through the gearbox whereby the gearbox features four offset input and output options.

15. Gearbox according to claim 1, further comprising an output half-shaft concentric with said primary shaft and fastened to the gearwheel of said output train and wherein said secondary shaft extends through the gearbox whereby the gearbox features one in-line input and output option and two offset input and output options.

16. Gearbox according to claim 1, wherein said primary shaft is split to constitute coaxial first and second primary shafts, said first primary shaft receiving said first clutch and constituting a first input of the gearbox and said second primary shaft receiving said second clutch and constituting a second input of the gearbox, whereby the gearbox features two separate coaxial inputs.

17. Gearbox according to claim 16, coupled to a power source by a slip-type coupling unit such as a fluid coupling or a hydraulic torque converter, wherein a first of said two separate coaxial inputs is coupled to a driven part of said coupling unit, being the part thereof subject to slip, and the second of said two separate coaxial inputs is coupled to a driving part of said coupling unit, whereby said first and third gear ratios and an optional reverse gear ratio are subject to slip and said second gear ratio and an optional fourth gear ratio are not subject to slip.

18. Gearbox according to claim 17, further comprising a freewheel interposed between said first and second primary shafts and adapted to prevent said first primary shaft rotating faster than said second primary shaft, whereby said third gear ratio is not subject to slip in traction and said first gear ratio and an optional reverse gear ratio are not subject to slip during motor braking.

19. Gearbox according to claim 1, wherein said single output gear train comprises two constant-mesh gearwheels and said independent input gear train is a double input gear train and comprises four constant-mesh gearwheels.

20. Gearbox according to claim 19, wherein the speed ratio of said input train between said sun gear of said planetary gearset and said first control clutch is less than unity whereby a third of said three gear ratios is an overdrive gear ratio.

21. Gearbox according to claim 19, wherein the speed ratio of said input train between said sun gear of said planetary gearset and said first control clutch is more than unity whereby a third of said three gear ratios is less than one-to-one.

22. Gearbox according to claim 1, further comprising a first brake for immobilizing said sun gear of said planetary gearset whereby the gearbox features a fourth gear ratio and a first braked neutral setting by respective combinations of said first brake with said second control clutch and with said third control clutch, a second brake for immobilizing said planet carrier of said planetary gearset whereby the gearbox features a reverse gear ratio and a second braked neutral setting by respective combinations of said second brake with said first control clutch and with said third control clutch.

* * * * *